(12) United States Patent  
Nowicki et al.

(10) Patent No.: US 7,146,377 B2
(45) Date of Patent: Dec. 5, 2006

(54) STORAGE SYSTEM HAVING PARTITIONED MIGRATABLE METADATA

(75) Inventors: Kacper Nowicki, Warsaw (PL); Olaf W. Manczak, Hayward, CA (US); Luis Ramos, Glendale, CA (US); Waheed Qureshi, Pleasanton, CA (US)

(73) Assignee: Agami Systems, Inc., Sunnyvale, CA (US)

( * ) Notice: Subject to any disclaimer, the term of this patent is extended or adjusted under 35 U.S.C. 154(b) by 0 days.

(21) Appl. No.: 10/431,168

(22) Filed: May 6, 2003

(65) Prior Publication Data

US 2003/0195895 A1    Oct. 16, 2003

Related U.S. Application Data

(63) Continuation of application No. 09/659,107, filed on Sep. 11, 2000, now abandoned.

(51) Int. Cl.
*G06F 17/30* (2006.01)

(52) U.S. Cl. .................. 707/102; 707/10; 707/101; 707/103 R; 707/104.1; 707/205

(58) Field of Classification Search .......... 707/1, 707/4, 10, 204, 3, 102, 104, 101, 103 R, 707/104.1, 200, 205, 206, 8; 725/87; 719/316
See application file for complete search history.

(56) References Cited

U.S. PATENT DOCUMENTS

| 5,276,867 | A | 1/1994 | Kenley et al. |
| 5,564,037 | A | 10/1996 | Lam |
| 5,727,197 | A | 3/1998 | Burgess et al. |
| 5,737,549 | A | 4/1998 | Hersch et al. |
| 5,897,661 | A | 4/1999 | Baranovsky et al. |
| 5,983,240 | A | 11/1999 | Shoroff et al. |
| 6,021,508 | A | 2/2000 | Schmuck et al. |
| 6,023,579 | A | 2/2000 | Hellgren et al. |
| 6,032,216 | A | 2/2000 | Schmuck et al. |
| 6,044,217 | A | 3/2000 | Brealey et al. |
| 6,047,356 | A | 4/2000 | Anderson et al. |
| 6,128,621 | A | 10/2000 | Weisz |
| 6,212,515 | B1 | 4/2001 | Rogers |
| 6,240,416 | B1 | 5/2001 | Immon et al. |
| 6,240,428 | B1* | 5/2001 | Yeung et al. ............... 707/206 |
| 6,260,040 | B1 | 7/2001 | Kauffman et al. |
| 6,275,867 | B1* | 8/2001 | Bendert et al. ............. 719/316 |
| 6,279,011 | B1* | 8/2001 | Muhlestein ................. 707/204 |
| 6,295,538 | B1 | 9/2001 | Cooper et al. |

(Continued)

OTHER PUBLICATIONS

PCT Written Opinion dated Apr. 28, 2004 corresponding to PCT/US02/18940.

(Continued)

*Primary Examiner*—Thuy N. Pardo
(74) *Attorney, Agent, or Firm*—DLA Piper Rudnick Gray Cary US LLP

(57) ABSTRACT

According to one embodiment, a metadata management system (MDS) may include partitioned migratable metadata. Metadata may be stored in multiple metadata partitions (102-0 to 102-11). Each metadata partition may be assigned to a particular system resource (104-0 to 104-5). According to predetermined policies, such as metadata aging, metadata stored in one metadata partition may be migrated to a different metadata partition. A forwarding object can be placed in the old metadata partition to indicate the new location of the migrated metadata. Metadata partitions (102-0 to 102-11) may be reassigned to different resources, split and/or merged allowing a high degree of scalability, as well as flexibility in meeting storage system needs.

20 Claims, 12 Drawing Sheets

U.S. PATENT DOCUMENTS

| | | | |
|---|---|---|---|
| 6,339,793 B1 | 1/2002 | Bostian et al. | |
| 6,405,198 B1 | 6/2002 | Bitar et al. | |
| 6,665,689 B1* | 12/2003 | Muhlestein | 707/204 |
| 6,681,227 B1* | 1/2004 | Kojima et al. | 707/10 |
| 6,820,095 B1* | 11/2004 | Yeung et al. | 707/200 |
| 6,973,455 B1* | 12/2005 | Vahalia et al. | 707/8 |
| 2002/0056126 A1* | 5/2002 | Srikantan et al. | 725/87 |
| 2002/0059172 A1* | 5/2002 | Muhlestein | 707/1 |
| 2002/0091710 A1* | 7/2002 | Dunham et al. | 707/200 |
| 2003/0200197 A1* | 10/2003 | Long et al. | 707/1 |
| 2004/0010493 A1* | 1/2004 | Kojima et al. | 707/4 |

OTHER PUBLICATIONS

Nowicki, Bill, Request for Comments (RFC) 1094, "NFS:Network File System Protocol Specification," Mar. 1989.

PCT International Search Report dated Sep. 18, 2002 corresponding to PCT/US02/18940.

* cited by examiner

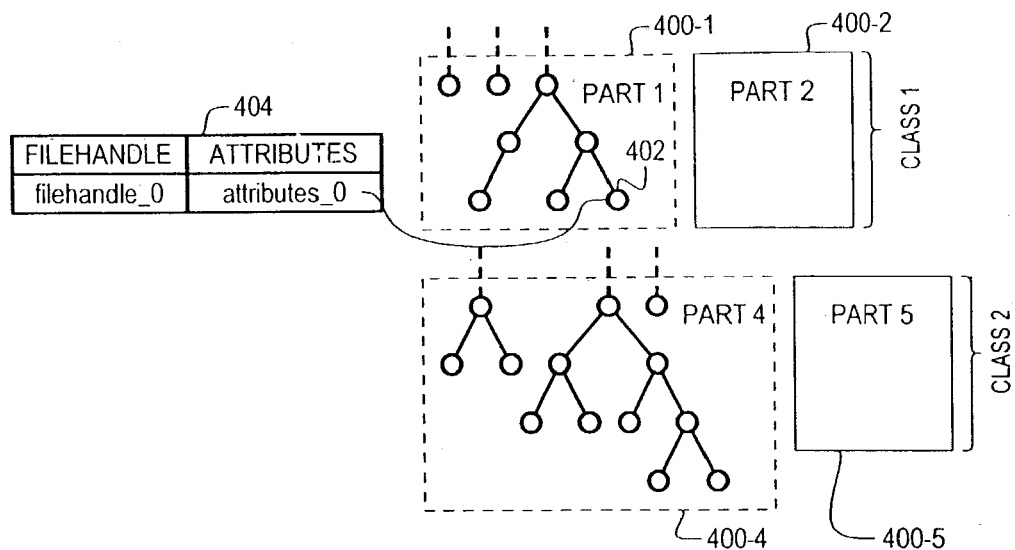
FIG. 4A
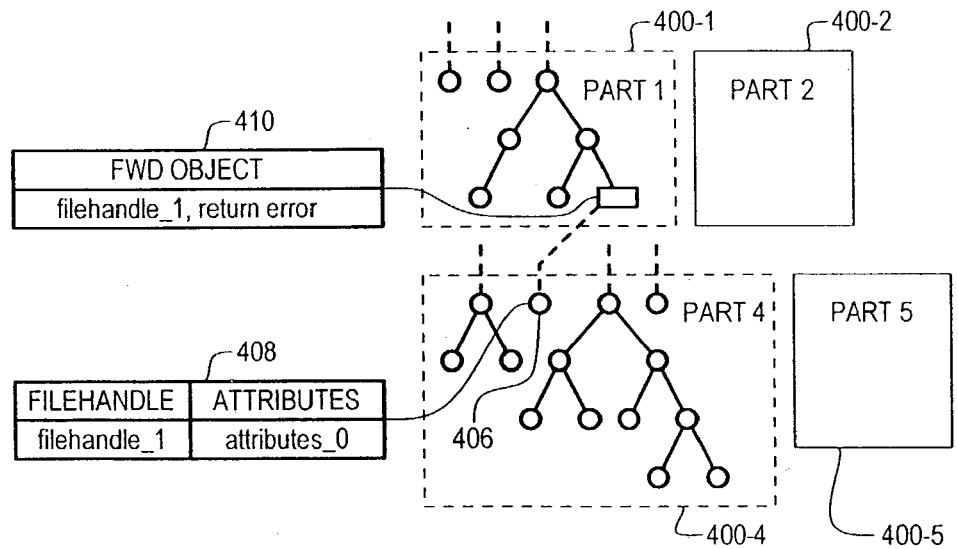
FIG. 4B
| ftype | filesys_id | system_id | file_id | part_id | dir_id |
|---|---|---|---|---|---|
| 01 | 0001 | 0000 0000 000D 3D8F | 0000 8000 AFF0 8C02 | 0001 | 000C 231A |
500
↓
| ftype | filesys_id | system_id | file_id | part_id | dir_id |
|---|---|---|---|---|---|
| 01 | 0001 | 0000 0000 000D 3D8F | 0000 8000 AFF0 8C02 | 0004 | 000C 231A |
502
FIG. 5

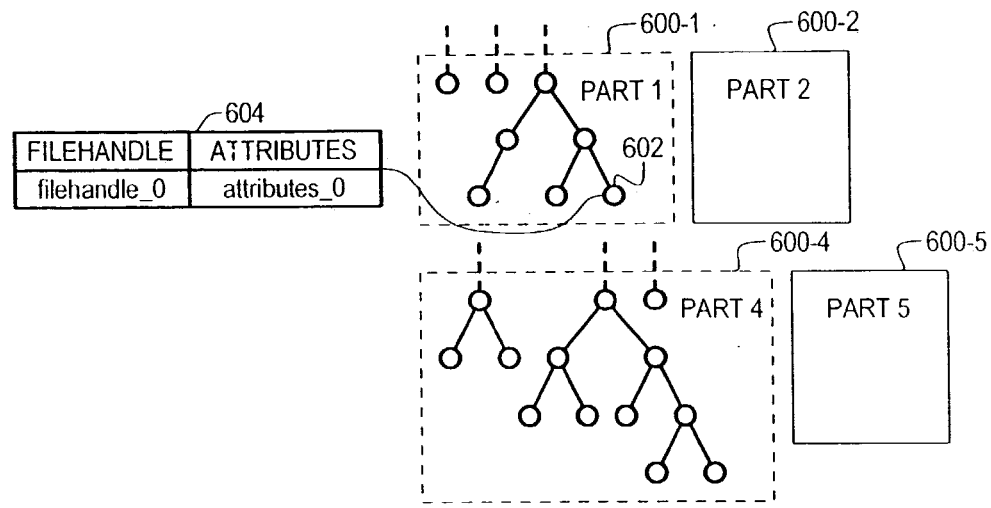
FIG. 6A
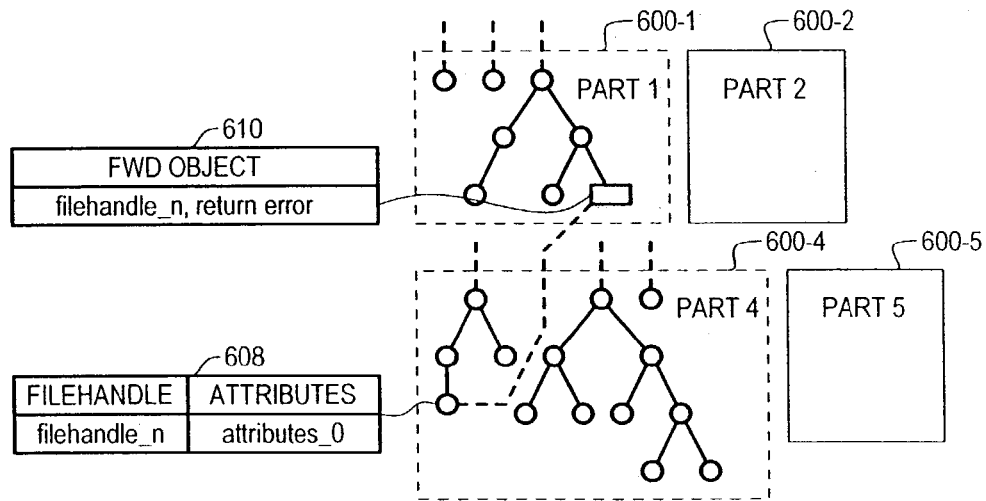
FIG. 6B
| ftype | filesys_id | system_id | file_id | part_id | dir_id |
|---|---|---|---|---|---|
| 01 | 0001 | 0000 0000 000D 3D8F | 0000 8000 AFF0 8C02 | 0001 | 000C 231A |
700
| ftype | filesys_id | system_id | file_id | part_id | dir_id |
|---|---|---|---|---|---|
| 01 | 0001 | 0000 0000 000D 3D8F | 0000 8000 AFF0 8C02 | 0004 | 000C 8DF9 |
702
FIG. 7

| FOWARDING OBJECT | MONITOR |
|---|---|
| 00 | 0021 |
| A6 | 0045 |
| A7 | 0030 |

```
Function GetAttributes {
    input filehandle
            access partition indicated by filehandle
            find metadata and filename for filehandle
            attributes = metadata file attributes
    output attributes, filename, filehandle}

Function SetAttributes {
    input filehandle, new_attributes
            access partition indicated by filehandle
            find metadata filename for filehandle
            metadata file attributes = new_attributes
            attributes = metadata file attributes
    output attributes}

Function CreateMetadata {
    input parent_directory, filename, attributes
            access partition indicated by parent_directory
            find location for new metadata in parent_directory
            create new filehandle with partition id
            filehandle =new filehandle
            attributes = new metadata file attributes
    output filehandle, attributes, filename}

Function RemoveMetadata {
    input filehandle
            access partition indicated by filehandle
            find metadata for filehandle
            attributes = metadata file attributes
            erase metadata
            revise file system
            flag = remove complete
    output flag}

Function RemoveName {
    input directory, filename
            access partition indicated by directory
            find location of metadata for filename
            if metadata removed
    output flag
            else
    output attributes, filehandle, filename}
```

FIG. 11A

Function *RenameFile* {
  input old_filehandle, old_filename, new_parent_filehandle, new_filename
    access partition indicated by new_parent_filehandle
    find location for renamed file metadata with new_parent_filehandle
    create new filehandle for new name with partition id and directory id
    filehandle =new filehandle
    attributes = new attributes
  output filehandle, attributes}

Function *CreateLink* {
  input filehandle, new_parent_directory, link_filename
    access partition indicated by new_parent_directory
    find location for linked file in new_parent_directory
    attributes = metadata for linked file
  output attributes, filename, filehandle}

FIG. 11B

```
Function ReadDirectory {
    input directory, count, last_entry_read,
        access partition indicated by directory
        find directory for directory
        if (function is being called for a first time)
            attribute_list = attributes for count number of entries in directory
        else
            attribute_list = attributes for count number of entries in directory starting at
                        last_entry_read
        if (last entry read)
            call_function_again = NO
            last_entry read = 1
        else
            call_function_again = YES
            last_entry_read = last entry in current attribute list
    output attribute_list, last_entry_read, call_function_again}

Function Lookup {
    input parent_directory, filename,
            find directory for parent_directory
            find metadata for file having filename
            attributes = attributes from metadata
    output attributes}

Function MultiLookup {
    input parent_directory, filename_list,
            find directory for parent_directory
            find metadata for any files having a filename within filename_list
            list_attributes = list of attributes for metadata
    output list_attributes}
```

FIG. 12

STORAGE SYSTEM HAVING PARTITIONED MIGRATABLE METADATA

This application is a continuation of application Ser. No. 09/659,107, filed Sep. 11, 2000 now abandoned.

TECHNICAL FIELD

The present invention relates generally to data storage systems, and more particularly to a high capacity storage systems that include metadata corresponding to stored files.

BACKGROUND OF THE INVENTION

The demand for high-capacity data storage systems continues to rise. As the interconnection of data networks continues, there is an increasing demand to store very large numbers of files in an efficient fashion while at the same time enabling such a storage system to grow as the number of files increases.

While various conventional data storage systems are known, such approaches have not always been efficient, easy to scale, or cost effective. Conventionally, data storage systems have resided on a monolithic server. A monolithic server can be conceptualized as including a single, very powerful computing resource dedicated to accessing files that may be stored on a variety of media. Such a monolithic server can maintain a collection of metadata for the stored files.

Metadata can include assorted file information including a filename, directory in which the file is located, physical location (offset), size of file, and type of file. Conventionally, metadata can reside on single partition accessed by a process to enable rapid lookups in, and/or access to the metadata.

A drawback to the monolithic server approach can be the difficulty involved in adapting such systems to changing needs. For example, the number of stored files, and consequently the amount of metadata and metadata accesses may increase over time. To meet such needs, the monolithic server may be upgraded. While processing speed can be improved by increasing computing resources (such as the number of central processing units (CPUs) and associated random access memory (RAM)), such increased resources can be difficult to implement as hardware upgrades may require the system to be non-operational for a certain period of time.

Monolithic server approaches may be undesirable as usage requirements may be outgrown. As just two examples, the amount of data stored or the amount of requests serviced may grow to the point where an existing monolithic server response is too slow or not capable of meeting usage requirements.

One conventional approach to meet increasing requirements can be to add servers. A drawback to such an approach can be added complexity to a user. A user may have to keep track of the multiple servers, as such servers are typically visible as separate entities to user applications. Further, with multiple servers, load imbalance may occur as one server is accessed/stores more than another. Consequently, a system administrator may have to manually shift files and/or set request routing as usage changes. This can be an extreme burden on a system administrator.

It is also noted that the management of multiple servers can be especially difficult for mission critical or Internet applications that may run twenty-four hours a day and 365 days a year, as such systems do not typically have a window of time available to reconfigure or upgrade the system.

Increases in metadata size can be difficult to accommodate as well. As the demands for larger capacity systems increase (e.g., petabyte or larger size systems), the amount of metadata can increase as well. However, if the metadata exceeds the monolithic server's storage capacity, changes to the system may have to be undertaken to enable larger storage capabilities. Further, the manipulation of metadata (as files are deleted, renamed, moved, etc.) may become more complex as the server must be capable of accessing more and more metadata in the management process.

One approach to addressing the storing of a large number of files has been to "migrate" stored files. Migration of stored files may include transferring files from one storage medium to another. Typically, "old" files (those that are not accessed after a certain period of time) can be migrated from a first storage medium that may provide relatively fast access (and hence may be more expensive), to a second storage medium that may provide slower access (and hence may be less expensive).

While migration of files may provide a solution for larger numbers of data files, there remains a need to address the increasing size of metadata. For data storage systems that store a large number of files, there is a need for a metadata storage approach that allows for a high degree of scaling, and/or ease in scaling, and/or flexibility in the arrangement of metadata, and/or more cost effective storage of metadata.

SUMMARY OF THE INVENTION

According to one embodiment, a data storage system may include a metadata management system that stores metadata on a number of different metadata partitions. Each partition is assigned a particular system resource. A system resource can access its corresponding metadata partition(s). System resources may be arranged in different classes, where one class may provide slower access and/or be less expensive than another class. Such an arrangement can allow for scaling as a new partition and/or new resource may be added to the metadata management system as needed.

According to one aspect of the embodiments, metadata residing on a first partition assigned to one resource can be moved to a second partition assigned to a second resource.

According to another aspect of the embodiments, metadata may be moved according to established policies. As but one example of a policy, infrequently used metadata may be migrated from a partition assigned to a more expensive resource, to another partition assigned to a less expensive resource.

According to another aspect of the embodiments, metadata may be moved when its corresponding file is renamed. The data storage system may include an organization system, such as a file system for organizing the metadata. When a file is renamed, its metadata may be moved to a new metadata partition.

According to another aspect of the embodiments, moving metadata from a first partition to a second partition may include moving the metadata to the second partition and placing a forwarding object in the first partition that indicates the new location of the moved metadata.

BRIEF DESCRIPTION OF THE DRAWINGS

FIGS. 4A and 4B are diagrams showing a metadata migration operation.

FIG. 5 is a diagram of a filehandle evolution for a metadata migration operation.

FIGS. 6A and 6B are diagrams showing a file renaming operation.

FIG. 7 is a diagram of a filehandle evolution for a file renaming operation.

FIGS. 11A and 11B shows examples of certain functions that may be included in a MDS interface.

FIG. 12 shows examples of other functions that may be included in an MDS interface.

DETAILED DESCRIPTION OF THE EMBODIMENTS

Various embodiments of the present invention will now be described in conjunction with a number of diagrams. The various embodiments include a system for managing metadata stored on different partitions. Such a system can allow for easy and cost-effective scaling and/or allow for the migration of metadata according to aging or other criteria. Further, the present invention may allow for easier or more effective management of large amounts of metadata as partitions can be added, split or merged as needed.

As noted above, conventional file storage systems have typically stored file metadata on a single partition. According to the present invention, a metadata management system may include metadata that may be distributed over multiple partitions.

MDS Block Diagram Representation.

Figure 1:
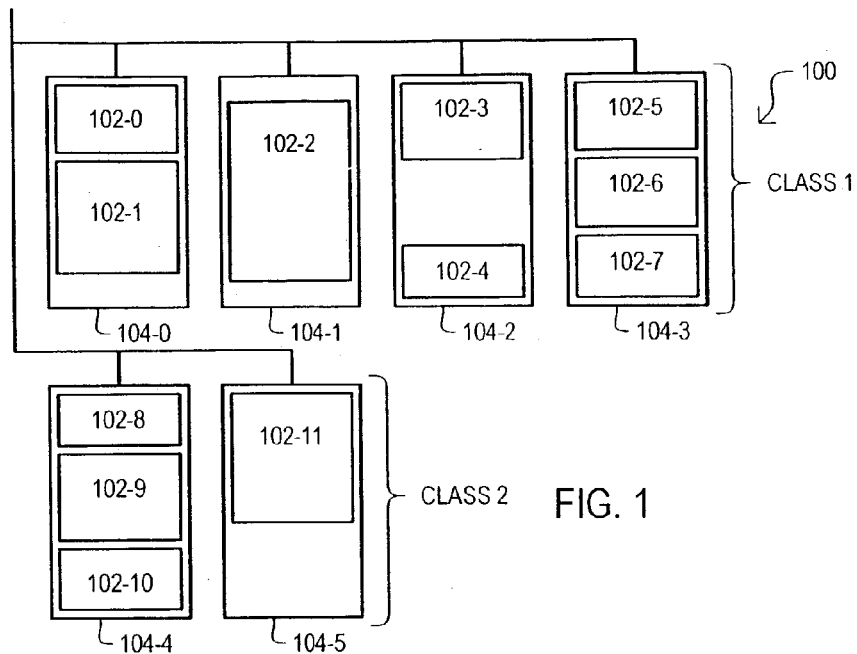
FIG. 1 is a block diagram of a metadata management system (MDS) according to one embodiment of the present invention.

To better understand the various advantages of a metadata management system according to the present invention, reference will now be made to FIG. 1. FIG. 1 is a block diagram representation of a metadata management system (MDS) 100. A MDS 100 may include various metadata partitions, shown as 102-0 to 102-11 assigned to particular system resources 104-0 to 104-5. FIG. 1 illustrates how multiple partitions may be assigned to resources. In particular, one partition 102-2 is assigned to system resource 104-1, two partitions 102-0 and 102-1 are assigned to system resource 104-0, and three partitions 102-5 to 102-7 are assigned to system resource 104-3. Of course, the particular number of system resources and partitions per system resource are provided by way of example, and should not be construed as limiting.

System resources (104-0 to 104-5) may fall into one or more classes. A system resource class can indicate a particular storage media, different class of machine, and/or different running process. Consequently, one class of system resource may provide faster access to its corresponding metadata partition(s) than another class. In addition, or alternatively, one class may provide a lower cost solution than another class (i.e., component costs and/or maintenance costs for the system resource are less expensive than those of other system resources).

An arrangement such as that set forth in FIG. 1 can allow resources to be optimized to the particular metadata stored. For example, partitions could be assigned to system resources based on the probability that metadata will be accessed, preventing one system resource from being overtaxed. Such an optimization of available system resources may provide for increased performance. This is in contrast to a conventional monolithic server approach, which may be conceptualized as a single, high-computing power resource applied to one metadata partition. In such a conventional approach, increases in performance can require expensive hardware upgrades to a monolithic server system.

MDS File System Representation

While FIG. 1 illustrates one example of a partition-resource relationship of a MDS, a MDS may also be conceptualized on a file system basis. One such example is set forth in FIG. 2.

Figure 2:
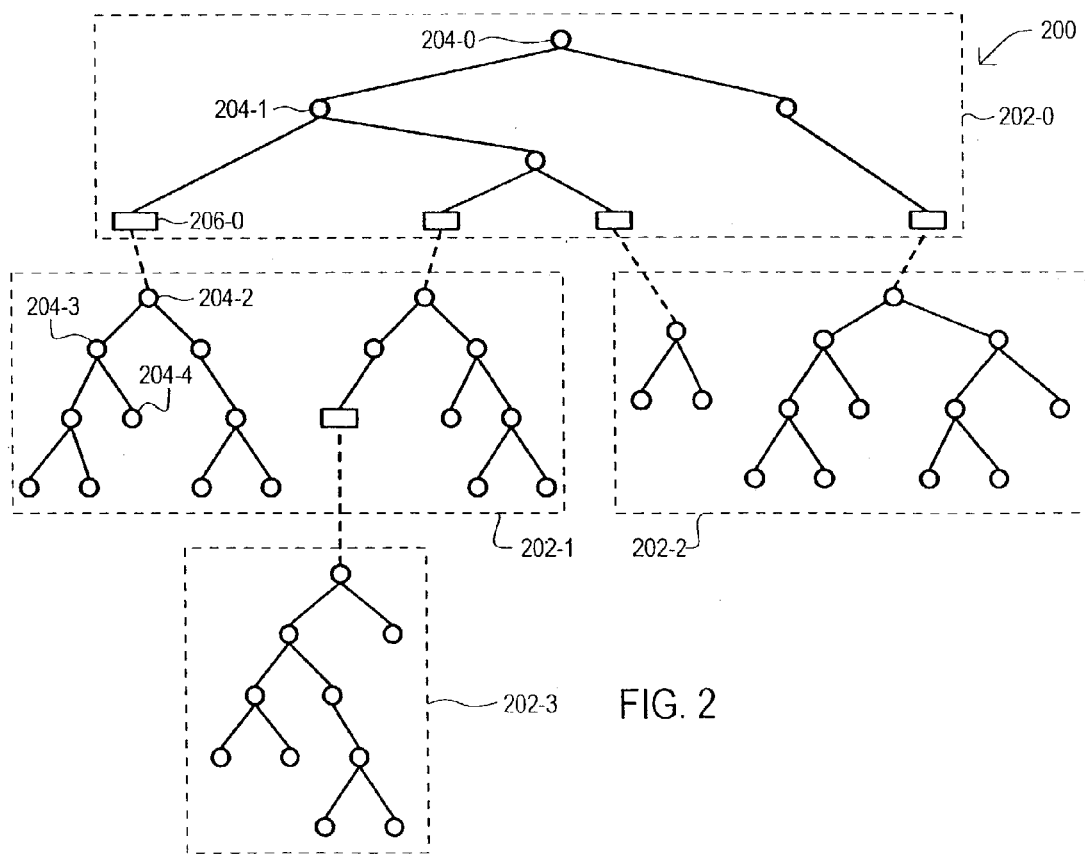
FIG. 2 is a diagram illustrating a file system according to one embodiment of the present invention.

FIG. 2 shows a MDS 200 file system that is distributed across multiple partitions (202-0 to 202-3). A partition 202-0 may contain a higher level portions of a file system (e.g., the top of a file system tree), while partitions 202-1 to 202-3 may contain lower level portions of the file system.

It is understood that one or more of the partitions (202-0 to 202-3) could be assigned to a particular resource. A conventional file system will typically include various nodes in some relation to one another. In a contrast, a MDS partition (202-0 to 202-3) according to the present invention may include nodes and "forwarding objects".

A node in FIG. 2 is indicated by a circle while a forwarding object is indicated by a rectangle. Nodes may provide some of the same functions as a conventional file system, namely organizing and providing file information. Forwarding objects may allow a metadata to span multiple partitions.

An example of a forwarding object that is accessed in a file system lookup will now be described. Referring now to FIG. 2, it will be assumed that a lookup, such as a directory lookup, is conducted to retrieve file information present at node 204-4. A lookup may be undertaken on behalf of a client. According to one arrangement, client metadata related requests can be translated into a MDS system request. Such a MDS system request may be issued by an MDS client that controls communication with a MDS 200.

In the example shown, a lookup may begin at node 204-0 in the highest level partition, partition 202-0. The lookup may proceed to node 204-1. However, because the desired file information is stored on a partition 202-1, the lookup can proceed to forwarding object 206-0.

Forwarding object 206-0 can point to node 204-2 in partition 202-1. In this way, a system according to the present invention may include a file system that spans multiple partitions.

The lookup may then resume within partition 202-1 at node 204-2, proceed to node 204-3, and finally arrive at the desired node 204-4.

It is noted that in arrangements where a MDS client, or the like, interfaces with an MDS 200, various accesses to different partitions, and indeed the existence of multiple MDS partitions, can be entirely hidden from a client.

Of course, it is understood that the particular directory structure shown should not be construed as limiting to the present invention, and is provided only by way of example. Further, a node in such file system may take a variety of forms. As but two possible examples, each node may include a filehandle and corresponding file attributes and/or each node may include a filehandle with a pointer to its corresponding attributes.

A file system distributed across multiple metadata partitions may take a variety of forms. As a first of the many possible examples, a client may forward a file name to retrieve metadata for such a file. Metadata may be arranged in various ways. This may be as simple as alphabetically storing files by a file name. As a second of the many possible examples, metadata may be stored according to a function based on a file attributes. This may include "hashing" one or more fields (e.g., the filehandle) with a hash function, and using the resulting value to determine in which metadata partition the metadata is to be stored. Of course, these two examples should not be construed as limiting to the invention. Numerous other file system approaches would be obvious to one skilled in the art.

MDS Operations

Figure 3A:
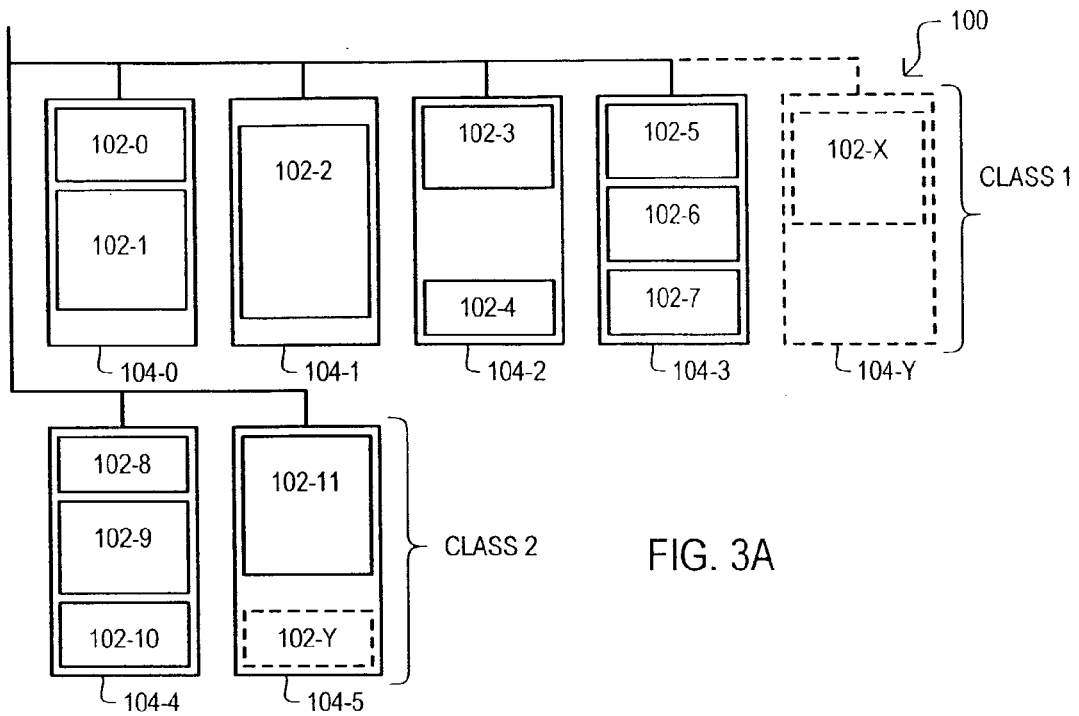
FIGS. 3A to 3C are block diagrams illustrating various operations that may be performed in a MDS according to the embodiment of FIG. 1.
Figure 3B:
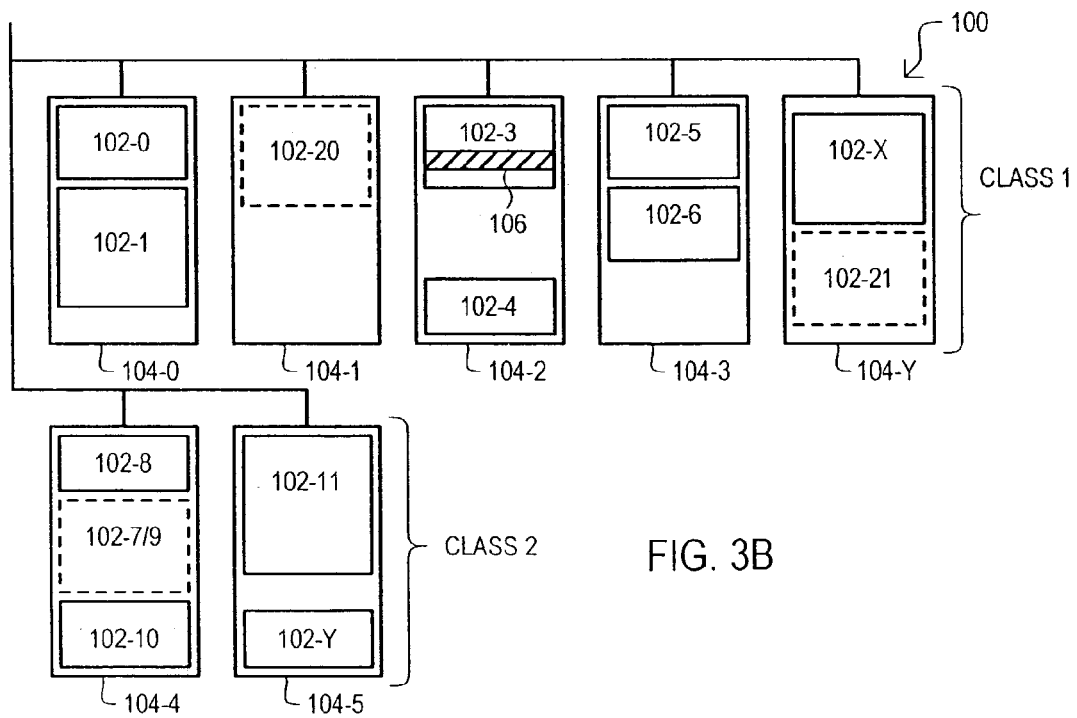
Figure 3C:
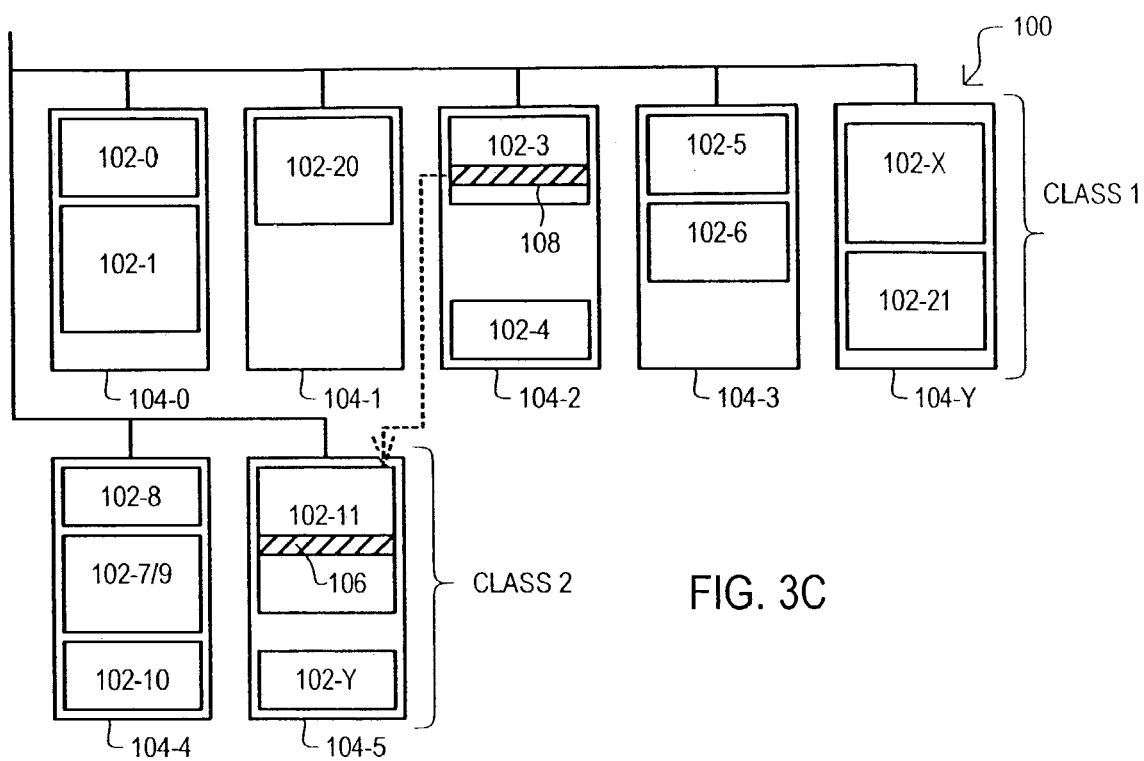

FIGS. 3A–3C are general representations of various operations that may be performed in a MDS 200. FIG. 3A include some of the same general items as FIG. 2. To that extent, like items will be referred to by the same reference characters.

Conventionally, file system metadata would be stored on a single partition. Consequently, such a file system could have limited scalability. If the amount of metadata outgrew the available partition space, an expensive and/or time consuming upgrade operation could be necessary to replace the current partition with a larger partition.

Conventionally, file system metadata would be assigned to a single resource. Consequently, such a system could be susceptible to failure or require expensive redundancy approaches. More particularly, if the single resource assigned to the metadata failed, the file system would be inoperable until the failure was addressed. Further, to address such susceptibility to failure, one or more parallel back-up resources would have to be provided that would reproduce all of the current metadata. Such a conventional arrangement may be more difficult to manage and implement in the event of a failure.

According to one approach of the present invention, MDS servers may run in redundant process pairs. Thus, the failure of one MDS server process can be replaced by another. Still further, for situations that include multiple MDS servers, such a redundant MDS server ratio does not have to be 1:1. As but one example, a first MDS server may access metadata alphabetically from letters A–C. A second MDS server may access metadata from letters D–F. A redundant MDS server may access metadata from letters A–F. Consequently, a failure of the first and/or second MDS servers can be met by the redundant MDS server.

Adding a Metadata Resource and/or Metadata Partition.

According to the present invention partitions and/or resources may be added. By providing such a capability, a MDS may be scaled to accommodate larger amounts of metadata and/or different metadata arrangements/configurations. It is noted that in monolithic server approaches, the entire server may have to be shutdown to accommodate additional storage for metadata. Still further, for different metadata arrangements/configurations, the software of the monolithic server may have to be upgraded and/or customized, also requiring server "down" time.

FIG. 3A provides one example illustrating how partitions and/or system resources may be added. FIG. 3A shows the MDS of FIG. 1 following the addition of two new partitions 102-X and 102-Y, and a new resource 104-Y.

A new resource 104-Y may be assigned to new partition 102-X. In the particular example of FIG. 3A, new resource 104-Y can be a CLASS 1 resource. Further, a new partition 102-Y may be assigned to an existing resource 104-5. This may be particularly advantageous if a system resource 104-5 is being underutilized. As shown in FIG. 3A, a system resource 104-5 can be a CLASS 2 resource.

Merging and Splitting Metadata Partitions.

An MDS according to the present invention may provide additional flexibility by enabling the merging and/or splitting of metadata partitions. FIG. 3B shows the system of FIG. 3A following the splitting of partition 102-2 into two partitions 102-20 and 102-21 and the merging of partitions 102-7 and 102-9 to form a partition 102-7/9. Such a capability is in contrast to a monolithic server approach, which may suffer from decreased performance, as existing resources might not capable be of addressing unexpected file activity and/or require downtime to add resources.

In the example of FIG. 3B, partition 102-2 was previously assigned to resource 104-1. The partition could be split into two partitions 102-20 and 102-21 assigned to resources 104-1 and 104-Y, respectively. Such a partition splitting could occur for various reasons. As but one example, the amount and/or type of metadata in partition 102-2 may be growing in size and/or being accessed more often. To accommodate such a larger size or increased resource needs, partitions 102-20 and 102-21 could be formed by splitting partition 102-2.

Of course, a partition splitting does not always include assigning a split-off partition to a different resource. Other operations may include splitting a partition for one resource, and assigning one of the new partitions to the same resource.

In the example of FIG. 3B, partition 102-7 and 102-9 were previously assigned to resources 104-3 and 104-4, respectively. The partitions could be merged into a single partition 102-7/9 for various reasons. As but one example, the amount and/or type of metadata in partitions 102-7 and 102-9 may not justify different partitions and/or the assignment of multiple resources to the partitions. The merging of partitions (102-7 and 102-9) may allow resource 104-3 to be applied to its remaining partitions, which may optimize system performance.

In this way metadata partition splitting and merging can provide for more flexibility, scalability, and/or optimization in a MDS.

Metadata Migration.

A MDS 100 according to the present invention can optimize resources over conventional approaches by migrating metadata to different system resource classes based on predetermined policies. Such predetermined policies may include, without limitation, access time for a file, client quality of service, number of metadata nodes in a partition, amount of remaining available space in a partition, etc. Of course, such particular policies are but examples and should in no way be considered limiting to the invention.

As but one very particular example, metadata that has not been accessed in a certain period of time can be migrated to a system resource that can be slower and/or less expensive (i.e., the metadata may be "aged"). This is in contrast to conventional monolithic server approaches, which can maintain a single, growing metadata collection, assigned to the same resource. FIGS. 3B and 3C illustrate a metadata migration operation.

It is first noted that system resources 104-0 to 104-3 and 104-Y are of a first class (CLASS 1), while system resources 104-4 and 104-5 are of a second class (CLASS 2). The first class resources are assumed, in this example, to be faster and/or more expensive than the second class resources. As but one very limited example, a second class resource may include a slower computing machine, and/or run a slower process, and/or use a smaller amount of memory in operation, and/or store data on a slower or less expensive medium.

FIG. 3B shows particular metadata 106 located in partition 102-3. Partition 102-3 has been assigned to first class resource 104-2. Based on predetermined policies particular metadata 106 will be migrated to a lower class resource.

In FIG. 3C, particular metadata 106 has been migrated to partition 102-11, which is assigned to second class resource 104-5. Further, a forwarding object 108 can be placed in partition 102-3 that can provides information to access the new (migrated) location of particular metadata 106 in partition 102-11.

Of course, the metadata migration example of FIGS. 3B and 3C shows but two classes of resources. More than two classes of resources could be included allowing policy based metadata migration through various classes of resources. Still further, in a typical operation multiple nodes can be migrated for more efficient use of system resources.

It is noted that migration of metadata according to the present invention could be independent of actual file migration. More particularly, while files may be migrated in some sort of storage system according to one set of criteria and/or policies, different criteria/policies could be used to migrate metadata in a MDS 100.

Filehandle Evolution.

Having described a metadata service and various operations with respect to partitions and system resources, the present invention will now be described with reference to a file system that contains metadata.

As noted previously, metadata may include information for a file. Such information may include assorted information particular to the file. In addition, the metadata for each file can have a corresponding unique identifier: a filehandle. In one particular embodiment, a filehandle may include immutable portions and changeable portions. Immutable portions can include unique identifiers that do not change when the metadata is moved for any number of reasons, including migration and/or renaming. However, a filehandle may also include changeable portions. Such changeable portions may change when metadata is moved from one metadata partition to another.

The term filehandle evolution is used herein to describe the process by which a metadata filehandle may be changed when the metadata is moved. Various examples of filehandle evolution will now be described.

Metadata Movement—Migration.

Referring now to FIGS. 4A, 4B and 5, an example of metadata migration will be described. In the case of metadata migration, it can be desirable to ensure that the metadata of a file should be accessible during and after the metadata has been moved to a different partition (e.g., a partition assigned to a lower class resource).

The example of FIGS. 4A and 4B represents the movement of a metadata for file system node 402 from one partition 400-1 of one class (CLASS 1) to a different partition 400-4 of another class (CLASS 2). The information corresponding to file system node 402 can be changed to allow the corresponding file metadata to be accessed even after it has been moved.

One example of metadata that may correspond to node 402 is shown as item 404. Metadata 404 is shown to generally include a filehandle and one or more associated file attributes. The particular metadata 404 has a filehandle of "filehandle_0" and attributes of "attributes_0".

Referring now to FIG. 4B, in a filehandle evolution operation, the metadata corresponding to node 402 has been moved to partition 400-4 and corresponds to a new node 406. Further, a forwarding object 410 now corresponds to the previous metadata location within partition 400-1. FIG. 4B shows one example of a forwarding object 410 at the "old" node, as well as new metadata 408 corresponding to "new" node 406.

In the example of FIG. 4B, newly moved metadata 408 can include a new filehandle "filehandle_1" and yet retain its file attribute information. The new filehandle (filehandle_1) can reflect the new location of metadata 408.

A forwarding object 410 may provide a number of functions. In the particular example of FIG. 4B, a forwarding object can return the new filehandle (filehandle_1), thereby allowing a service to access the new metadata location. Further, a forwarding object may return a particular message (e.g., an error message) indicating that the metadata has been moved. In one very particular example, a MDS client can handle forwarding object errors, making accesses to multiple partitions and providing desired metadata without the multiple accesses being apparent to a client.

FIG. 5 provides one very particular example of a filehandle evolution. FIG. 5 includes a first filehandle 500 corresponding to metadata prior to movement between partitions (e.g., due to migration). A second filehandle 502 corresponds to the filehandle after movement of the corresponding metadata between partitions.

The filehandles (500 and 502) have very particular fields, and should not be construed as limiting the invention. The filehandle fields shows a filehandle type field (ftype), a filesystem id field (filesys_id), a system assigned identifier field (system_id), a file identifier field (file_id), a partition identifier (part_id), and a directory identifier (dir_id).

A ftype field may indicate the particular type of file corresponding to the metadata (e.g., standard, directory, etc.). A system_id field may indicate a unique value assigned to a file by a system. A file_id may indicate a unique value for identifying a particular file. A filesystem id field may identify a particular file system type (e.g., Unix or NFS). The filesys_id and file_id fields may be immutable portions of a filehandle.

Filehandles 500 and 502 may also include changeable portions. In the particular example of FIG. 5, changeable portions may include the part_id, dir_id and ftype fields. The particular filehandle evolution of FIG. 5 may correspond to the operation shown in FIGS. 4A and 4B. Thus, in the metadata movement, a part_id may be changed from "0001" (which may correspond to partition 400-1) to "0004" (which may correspond to partition 400-4). Because metadata (500 and 502) may maintain the same logical relationship within a file system, a dir_id value may remain unchanged.

Metadata Movement—Renaming.

The example of FIGS. 6A and 6B shows the renaming of a particular file, resulting in a file system node 602 being moved from one partition 600-1 to another partition 600-4. The data associated with file system node 602 can be changed to allow the corresponding file metadata to be accessed even after the file has been renamed.

As in the migration example shown in FIGS. 4A and 4B, a filehandle may have one value (filehandle_0) prior to renaming, and another value (filehandle_n) after the renaming. Further, a forwarding object 610 may be created that corresponds to the "old" node.

FIG. 7 provides one particular detailed example of an old filehandle 700 prior to a renaming and a new filehandle 702 after a renaming. Filehandles 700 and 702 are similar to those shown in FIG. 5. However, unlike FIG. 5, a new filehandle 702 may include a dir_id field that changes from one directory value (000C 231 A) to another (000C 8DF9), reflecting the new metadata's logical position in a file system.

In one embodiment, a forwarding object (such as 610 of FIG. 6B) may be temporary. That is, according to particular predetermined policies, a forwarding object can be destroyed.

Figures 8, 10:
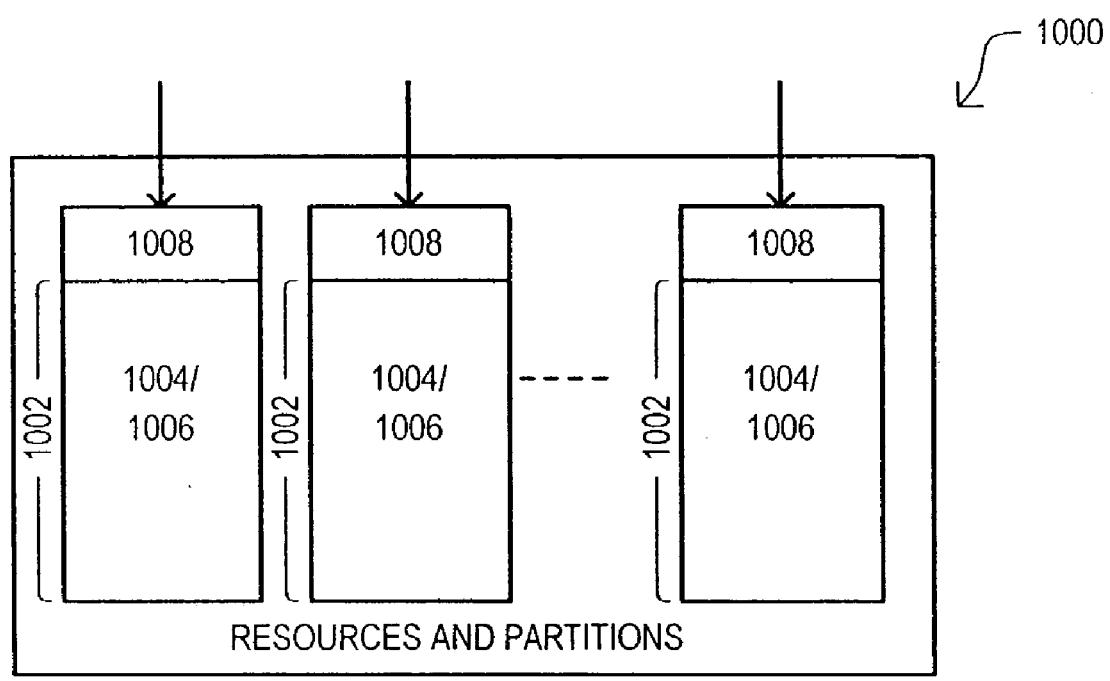
FIG. 8 is a block diagram of a forwarding object table according to one embodiment.
FIG. 10 is a block diagram of a MDS according to another embodiment.

One of the many possible ways to accomplish the destruction of a forwarding object is illustrated in FIG. 8. FIG. 8 shows one example of a forwarding object table. Such a table may monitor all current forwarding objects, and according to predetermined policies, destroy a forwarding object. The one example of FIG. 8 shows a forwarding object id column and a monitor column. A monitor column may include data that is monitored to determine when/if a forwarding object may be destroyed.

One of the many possible policies used to determine if a forwarding object should be destroyed may be the "age" of a forwarding object. If a forwarding object has been in existence for longer than a certain amount of time, the forwarding object will be destroyed. Of course, various other policies may be used in addition or alternatively to age. As but a few examples, forwarding objects may be destroyed based in infrequency of access, all forwarding objects can be destroyed in a periodic fashion, or forwarding objects may be destroyed simultaneously on a partition-by-partition basis, etc. Along these same lines, a function may be called that can compare information in the forwarding object to predetermined criteria and then destroy the object depending upon the comparison result.

Figure 9A:
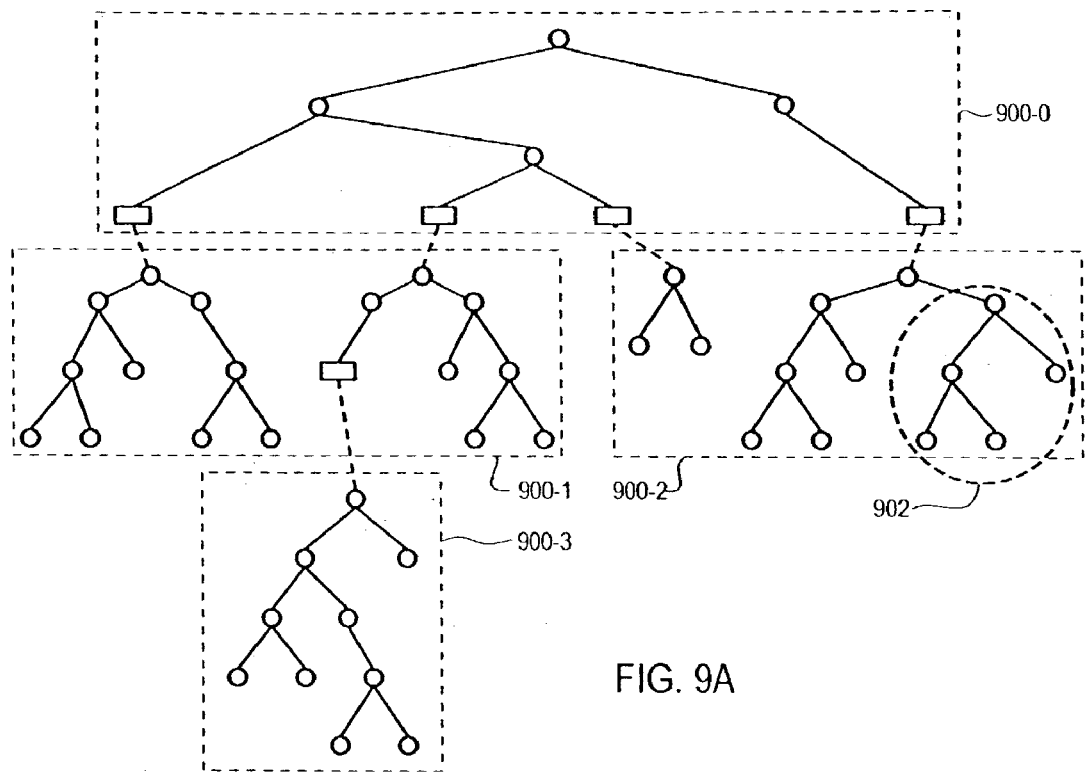
FIGS. 9A and 9B are diagrams representing the movement of a group of metadata between partitions.
Figure 9B:
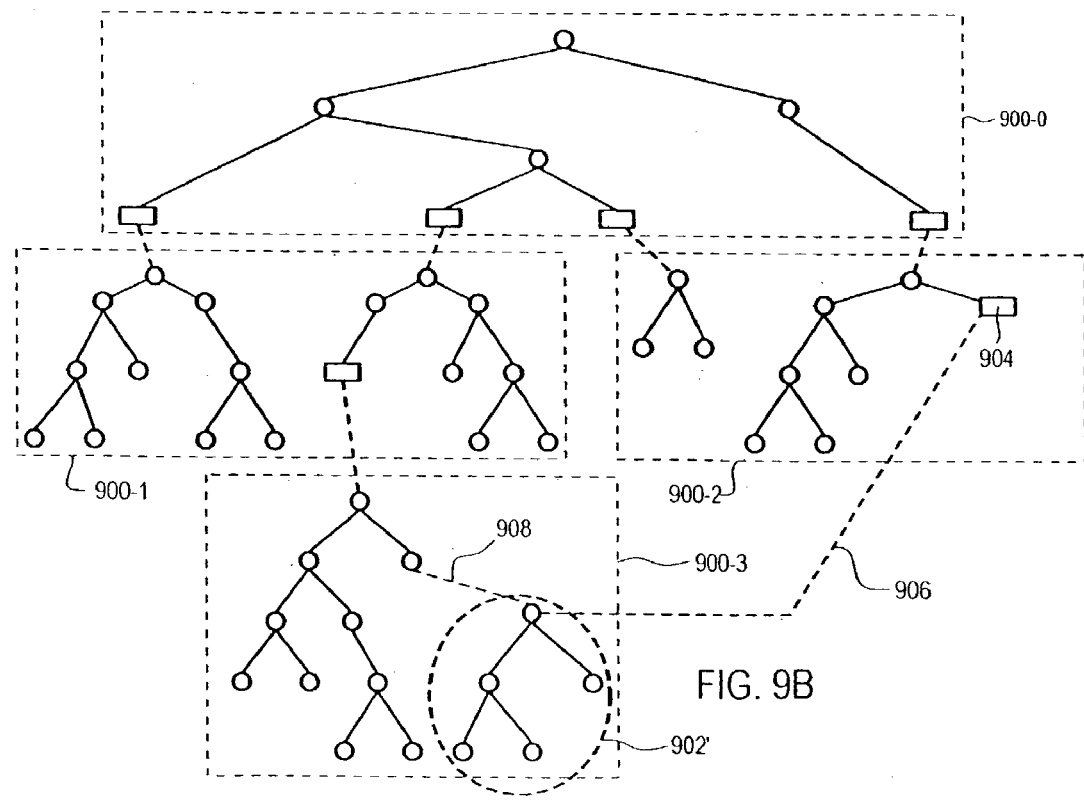

While the above examples have described evolution of a single filehandle due to metadata movement between partitions, it would be obvious to one skilled in the art that metadata corresponding to multiple files may be moved together. FIGS. 9A and 9B show one representation of the movement of a group of metadata.

FIGS. 9A and 9B are a representation of a file system having various nodes, each of which may correspond to particular metadata. Nodes may be conceptualized as being distributed across various partitions (900-1 to 900-3). In FIG. 9A, metadata for a group of nodes 902 is within partition 900-2. In FIG. 9B, metadata for group 902 is moved from partition 900-2 to partition 900-3, to form new group 902'. A forwarding object 904 has also been associated with the highest directory location corresponding to the old group 902.

As noted in the previous examples, a forwarding object 904 may include information that can enable the metadata of moved group 902' to be accessed. This is represented by logical path 906.

FIG. 9B also includes new logical path 908 that may represent a renaming case, in which the new group 902' may have new logical relationship within a file system. In the case of a migration operation, such a new logical path. 908 may not exist. The filehandles corresponding to the nodes of new group 902' may be changed to represent new partition location (900-3). In the case of a renaming operation, filehandles may be changed to reflect new directory information.

MDS Interface and Functions.

FIG. 10 shows a block diagram of one embodiment of a MDS 1000. A MDS 1000 may include various resources and partitions 1002. Resources and partitions 1002 may include a file system 1004 and metadata 1006 for a storage system. Metadata 1006 may include file attributes and filehandles.

A MDS 1000 may also include an interface 1008 that may call one or more functions in response to requests/accesses to metadata. One of the ways in which an interface may differ from conventional approaches is that the various functions may receive a filehandle as an input value that includes a particular partition value. In addition, the execution of a function may include accessing a desired partition, and then performing a particular metadata operation. This is in contrast to conventional monolithic server approaches, which may access a single partition of metadata, and so not include functions that operate by accessing one metadata partition from multiple metadata partitions.

Particular examples of functions that may be performed by an interface 1008 are set forth in FIGS. 11A, 11B and 12. FIGS. 11A and 11B show functions that may utilize input values that include partition id data. In particular, filehandle values for particular files, or directory values can be inputs to a function. The function may then use such values to access a particular partition and perform a particular operation. The various functions of FIGS. 11A, 11B and 12 are set forth in pseudocode.

As shown in FIG. 11A, GetAttributes function may input a filehandle value and output the attributes corresponding to the filehandle. Such a function may include accessing a partition indicated by the input filehandle and then accessing the metadata corresponding to the filehandle located in the partition. The attributes may then be output as a returned value. A SetAttributes function may input a filehandle value and a set of attributes (new_attributes). A partition containing the metadata for the filehandle can be accessed, and the metadata may be changed to include the new set of attributes. The new attributes may then be output along with the corresponding filehandle and filename.

A CreateMetadata function may input a parent directory value, filename, and attributes for a new file. New metadata can be created according to the new filename's position in the parent directory. A filehandle can be created for the metadata. Such a filehandle may include metadata partition information that indicates the location for the metadata. The new filehandle and attributes can then be output along with the new filename.

A RemoveMetadata function can be used to remove metadata from a system. Metadata may be located on its partition according to an input filehandle. Corresponding attributes may then be read. Metadata may then be deleted and a file system revised to reflect such a deletion. A flag may then be set to indicate that the metadata has been removed. The flag and read attributes may then be output. It is noted that a RemoveMetadata function may not actually delete metadata initially. As but one example, a RemoveMetadata function may maintain a list of metadata to be deleted. When a message (i.e., by way of another function or the like) indicates that the file corresponding to the metadata has been deleted, the corresponding metadata may then be deleted from its metadata partition.

A RemoveName function can be used to remove metadata for a file that may include multiple links. A RemoveName function can receive a directory value and filename as inputs. Metadata for the file that is to be removed can be located with directory and filename information. If the metadata is removed, a flag can be returned indicating the operation is complete. Otherwise, the attributes, filehandle and filename can be returned.

Referring now to FIG. 11B, a RenameFile function can be used to change metadata when a file is renamed. A file filehandle prior to the name change (old_filehandle) and old filename (old_filename) can be used to access the metadata of the file that is to be renamed. A new filename (new_filename) and new parent directory (new_parent_directory) may be input to determine a new location for the metadata under the new name. A new filehandle may then be created based on the new name. As described above, a file name change may result in a filehandle having a change in a partition id value. The new filehandle can then be output along with corresponding attributes.

A CreateLink function can be used to establish a hard link between a file and a directory (new_parent_directory). A link may be created under a file name (link_filename) in the directory. Metadata for the linked file may then be output along with the corresponding filename and filehandle.

In this way, various functions may access particular partitions according to input values and perform operations on the metadata of the partitions.

Referring now to FIG. 12, a ReadDirectory function can be used to read the metadata contained in an identified directory. A directory value may be input to identify the directory. In addition, a count value and last entry value (last_entry_read) may also be input. A count value can indicate the number of metadata entries that will be retrieved. A count value can initially be one, but may be a different value in the event the directory cannot be read in a single function call, and the function is called more than once.

A directory may be accessed according to the input directory value. In the event the function is being called for a first time, a metadata attribute list having a length equal to the count value can then be formed. If the attributes for all entries in the directory can fit in the list, a flag (call_function_again) can be set to value indicating that the function does not need to be called a second time. If there are more attribute entries than the count value, the flag can be set to another value indicating that the function must be called again. Further, a last entry value (last_entry_read) can be returned so that a subsequent function call can begin where the previous function call left off.

A Lookup and MultiLookup function can be used to retrieve attributes corresponding to a particular file name or a multipart file name. Parent directory values may be input along with a file name or multipart file name. Attributes corresponding to file name(s) can then be output.

In this way, a file system may be accessed (e.g., via a directory structure) to retrieve metadata for particular files. It is noted, unlike conventional approaches, metadata can be retrieved from different metadata partitions.

Of course, the above-described functions represent but particular examples and one particular set of functions that may be provided by a MDS interface.

Examples of Systems that may Include a MDS.

Figure 13:
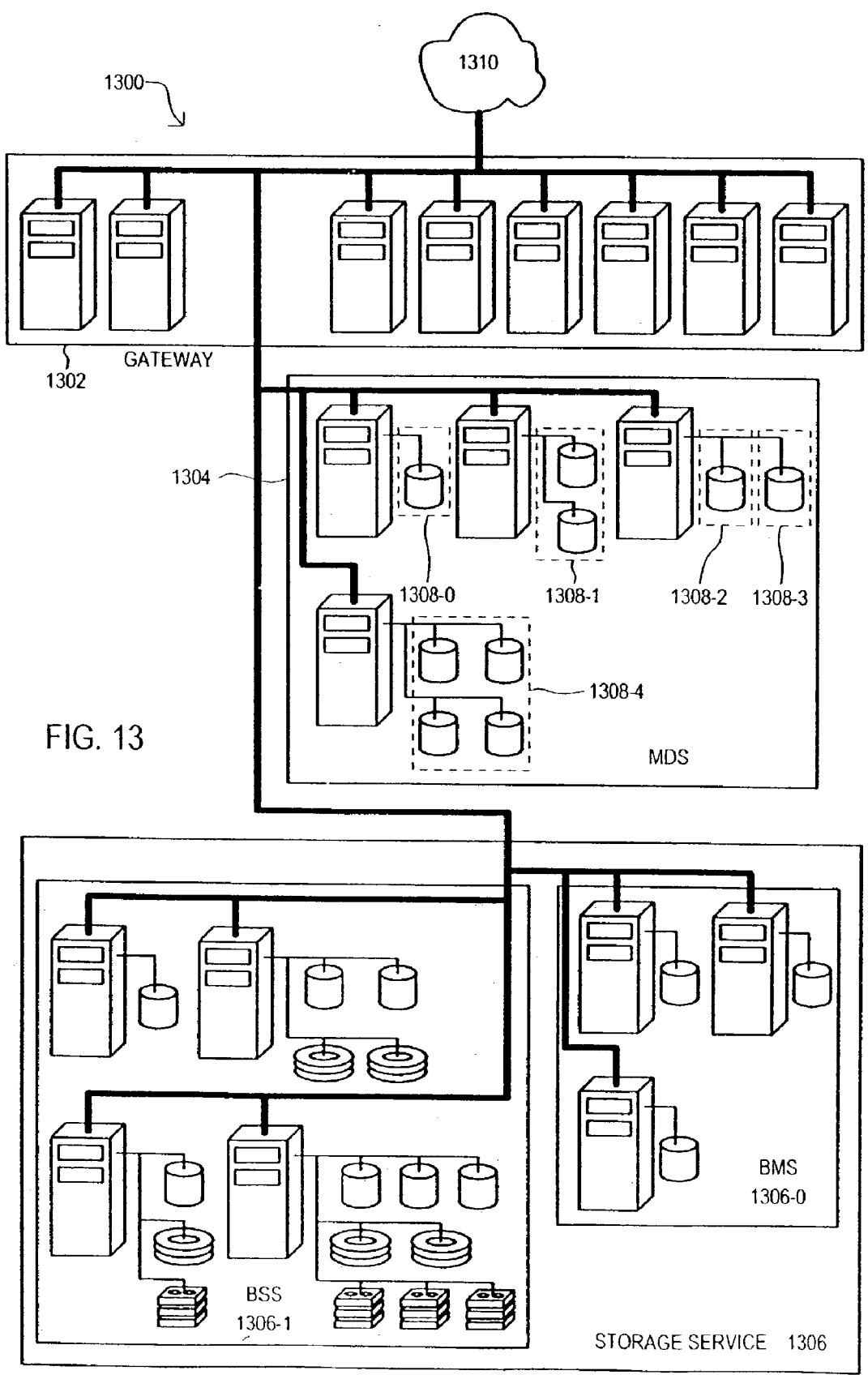
FIG. 13 is an example of a system that may include a MDS according to one embodiment.

Referring now to FIG. 13, a block diagram is shown illustrating one example of a data storage system that may include a metadata management system (MDS) according to one embodiment. The data storage system is designated by the general reference character 1300 and is shown to be sub-divided into a number of sub-systems, including a gateway service 1302, a MDS 1304, and a storage service 1306. A storage service 1306 may further include a bitfile management service (BMS) 1306-0, and a bitfile storage service (BSS) 1306-1.

Files may be stored by the BSS 1306-1. A BMS 1306-0 can manage accesses to the files. A MDS 1304 may store metadata corresponding to the files stored in the BSS 1306-1. Such metadata may include, without limitation, unique file identifying information, such as filehandle. Further, such metadata may also include other information that can be used by other systems to identify the location of a data file. As noted above, such information can change in the event a file is moved, renamed or otherwise manipulated.

As previously noted, MDS 1304 may include multiple partitions, or the ability to accommodate multiple partitions of metadata. Further, in particular embodiments, a MDS 1304 may include an interface for executing various file related functions, including those that create, remove, and rename data files, as well as those that access various attributes of data files stored in the overall data storage system 1300. Unlike a conventional monolithic server approach, the MDS 1304 may include a collection of loosely coupled servers that service metadata requests and functions, where servers in the MDS are separate from those servers situated in the storage service 1306 that provide access to the files corresponding to the metadata.

As previously noted, a MDS 1304 may include metadata distributed across multiple partitions. Multiple partitions are diagrammatically represented in FIG. 13 by items 1308-0 to 1308-4. It is understood that partitions may exist as data blocks, files, and even databases on various different types of media. Advantageously, system resources may be assigned to various partitions, and may also vary. System resources may include physical machines, storage media space, as well as particular processes. Such processes may include various functions for accessing and/or manipulating the metadata.

According to one embodiment, a gateway service 1302 may receive various requests from a client. Metadata related requests can be serviced by the MDS 1304, which can include its own set of servers and multiple partitions. Actual file related service (e.g., reads, writes, etc.) can be serviced by the storage service 1306, which may include servers and partitions separate from those of the MDS 1304. In the example of FIG. 13, gateway service 1302 may receive client requests by way of a network 1310, such as the Internet, as but one example.

While the example of FIG. 13 has described a metadata management system (MDS) that is essentially "de-coupled" from an independent storage service, alternate embodiments could include more particular correspondence between metadata and the files corresponding to the metadata. On such example is shown in FIG. 14.

Figure 14:
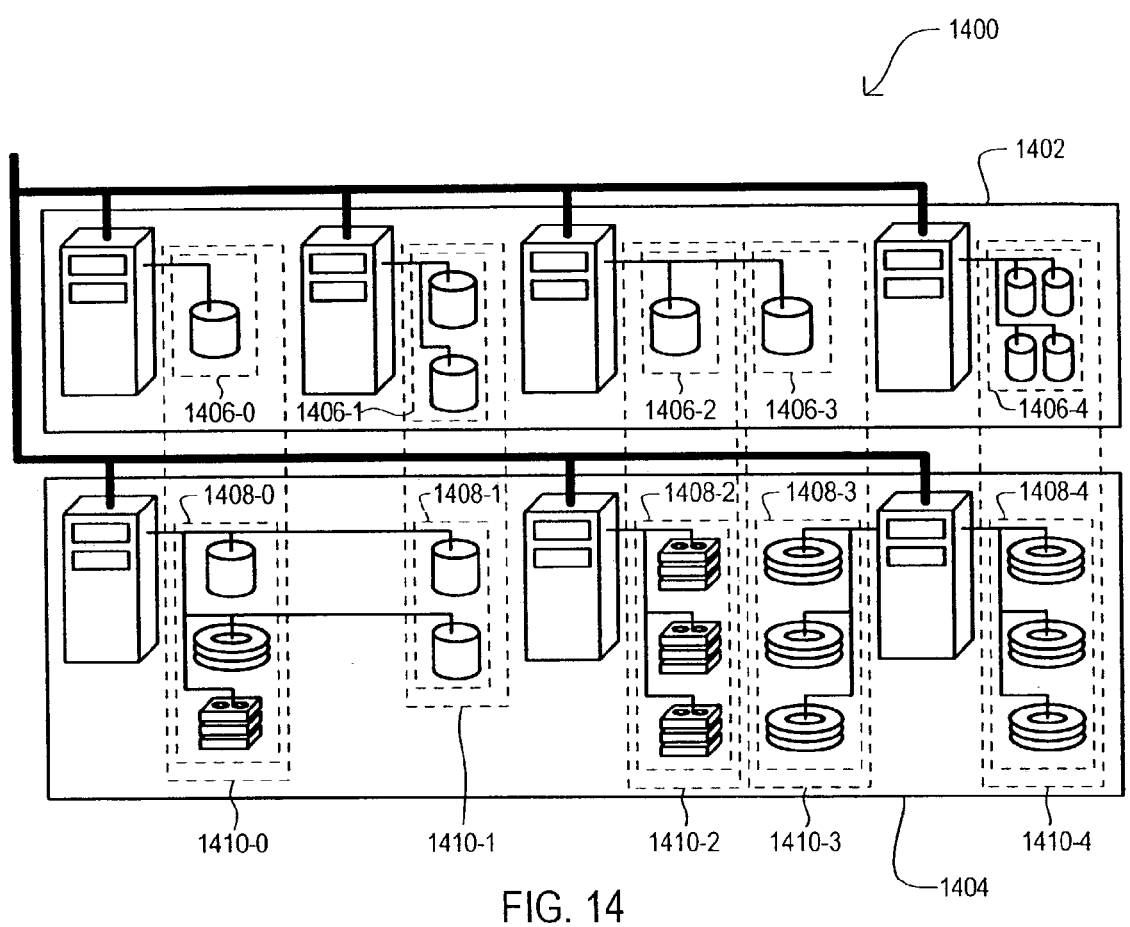
FIG. 14 is an example of an alternate system that may include a MDS according to one embodiment.

FIG. 14 shows an alternate embodiment in which metadata and corresponding files are managed with the same "granularity." FIG. 14 includes a system 1400 with a metadata management system (MDS) 1402 and a corresponding storage service 1404. Other system components (such as a gateway) have been excluded to avoid unduly cluttering the view. A MDS 1402 and storage service 1404 can be independent servers that provide various system resources to corresponding partitions. Metadata partitions are represented in FIG. 14 by items 1406-0 to 1406-4. File storage partitions are represented by items 1408-0 to 1408-4. Identical granularity exists because for each metadata partition there is a corresponding file storage partition. Correspondence between metadata partitions and file storage partitions are shown by dashed lines 1410-0 to 1410-4.

In an arrangement such as FIG. 14, movements of metadata from one metadata partition to another, may require the corresponding file to be moved between corresponding file storage partitions.

Of course, it is understood that FIG. 14 represents but one of the many possible variations according the present invention.

It is thus understood that while the preferred embodiments set forth herein have been described in detail, the present invention could be subject various changes, substitutions, and alterations without departing from the spirit and scope of the invention. Accordingly, the present invention is intended to be limited only as defined by the appended claims.

What is claimed is:

1. A method of storing data files in one or more hierarchical file systems, comprising the steps of:
    storing files in a storage service system including one or more first servers;
    storing file system metadata corresponding to the files on a plurality of metadata partitions located on one or more second servers that are separate from the one or more first servers of the storage service system; and
    moving file system metadata from one metadata partition to another metadata partition according to predetermined policies.

2. The method of claim 1, further including:
    assigning each metadata partition to a resource, each resource providing access to the file system metadata in the metadata partition to which the resource is assigned.

3. The method of claim 2, wherein:
    the resources include at least one first class resource and at least one second class resource, the second class resource providing access to a metadata partition in a different manner than the first class resource provides access to a metadata partition.

4. The method of claim 3, wherein:
    the second class resource has fewer computing resources than the first class resource.

5. The method of claim 1, wherein:
    the predetermined policies include an amount of time since the file system metadata was last accessed.

6. The method of claim 1, wherein:
    the predetermined policies include available metadata partition space.

7. The method of claim 1, wherein:
    the predetermined policies include a quality-of-service value.

8. The method of claim 1, wherein:
    each file has a corresponding file name; and further including:
        moving file system metadata from a first metadata partition to a second metadata partition when a file name is changed, if the new file name falls within the second metadata partition according to a file system.

9. The method of claim 1, wherein:
    moving the file system metadata from the one metadata partition to another metadata partition includes
        moving the file system metadata to another metadata partition, and
        placing a forwarding object in the one metadata partition that indicates the new location of the moved file system metadata in the other metadata partition.

10. The method of claim 9, further including:
    maintaining a list of forwarding objects and destroying selected forwarding objects based on predetermined policies.

11. The method of claim 10, wherein:
    the predetermined policies include last time of access to the forwarding object.

12. The method of claim 1, further including:
    splitting a metadata partition into at least two different metadata partitions.

13. A system for providing storage of one or more hierarchical file systems, comprising:
    a storage service that store a plurality of files; and
    a metadata management system that is physically separate from said storage service and that includes
        a plurality of metadata computing resources, and
        a plurality of metadata partitions that store file system metadata corresponding to the files, at least one metadata partition being assigned to each metadata computing resource; wherein the metadata management system is adapted to move file system metadata from one metadata partition to another metadata partition according to predetermined policies.

14. The system of claim 13, wherein:
    each metadata computing resource is selected from the group consisting of a computing machine, a storage medium, and a computing process.

15. The system of claim 13, wherein:
    the metadata management system further includes a file system that indexes to file system metadata stored on at least two metadata partitions.

16. The system of claim 13, wherein:
    the storage service includes a plurality of file storage partitions, each file storage partition being assigned to a storage computing resource that is different than a metadata computing resource.

17. The system of claim 16, wherein:
    each metadata partition corresponds to a file storage partition, and stores file system metadata for files stored in the corresponding file storage partition.

18. A method for migrating file system metadata in a storage system for providing storage of one or more hierarchical file systems, comprising the steps of:
    storing file system metadata on a plurality of metadata partitions;
    assigning a computing resource to each metadata partition, where such computing resources include a first class resource and a second class resource;
    moving file system metadata from a partition assigned to a first class resource to a partition assigned to a second class resource based upon predetermined policies.

19. The method of claim 18, wherein:
    the predetermined policies include time of last access to the file system metadata.

20. The method of claim 18, wherein:
    the file system metadata includes a filehandle associated with a corresponding file; and
    the step of moving file system metadata includes moving selected metadata from an old metadata partition to a new metadata partition and placing a forwarding object in the old metadata partition that indicates the location of the selected file system metadata in the new metadata partition.

* * * * *